F. R. CORNWALL.
ADJUSTABLE BRAKE HEAD.
APPLICATION FILED JAN. 10, 1910.

960,828.

Patented June 7, 1910.

WITNESSES
Wm Janus.
F. M. Harrington.

INVENTOR
Frederick R. Cornwall

UNITED STATES PATENT OFFICE.

FREDERICK R. CORNWALL, OF ST. LOUIS, MISSOURI, ASSIGNOR TO CHICAGO RAILWAY EQUIPMENT COMPANY, OF CHICAGO, ILLINOIS, A CORPORATION OF ILLINOIS.

ADJUSTABLE BRAKE-HEAD.

960,828.  Specification of Letters Patent.  Patented June 7, 1910.

Application filed January 10, 1910. Serial No. 537,139.

*To all whom it may concern:*

Be it known that I, FREDERICK R. CORNWALL, a citizen of the United States, residing at St. Louis, Missouri, have invented a certain new and useful Improvement in Adjustable Brake-Heads, of which the following is a full, clear, and exact description, such as will enable others skilled in the art to which it appertains to make and use the same, reference being had to the accompanying drawings, forming part of this specification, in which—

Figure 1:
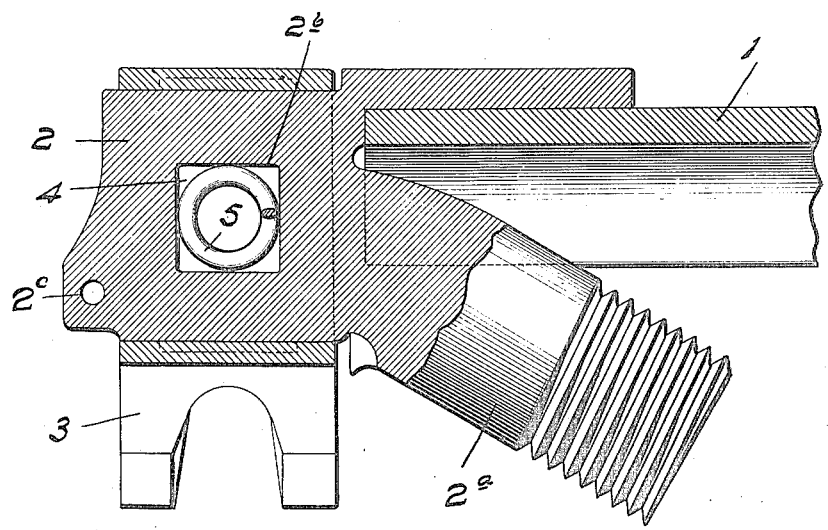
Figure 2:
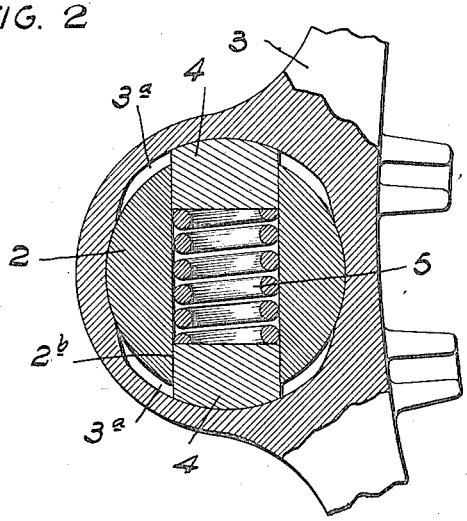

Figure 1 is a longitudinal sectional view through my improved adjustable brake head. Fig. 2 is a transverse sectional view through the same.

This invention relates to a new and useful improvement in adjustable brake heads designed especially for use in connection with trussed brake beams, and particularly with that type of trussed brake beam wherein the thrust block or member on which the brake head is adjustably mounted, may be provided with an opening extending therethrough from side to side.

The object of my present invention is to utilize the expansive energies of the spring so that the full power thereof is directed in opposite directions, and preferably radially, against the wall of the socket of the brake head to frictionally hold said brake head in adjustable position.

Locking blocks with serrated surfaces have been extensively used in connection with adjustable brake heads, but one objection to this form of adjusting device, and which objection obtains with respect to all similar forms of adjusting devices, is, that the adjustment can only be made in equidistant steps. There is no means for holding the brake head in a position between any two steps, and if, in the application of the brakes, the head is moved to a position between the steps, such movement, on account of the inclined faces of the serrations, will be repeated, and in a reverse direction, when the brakes are released, and consequently considerable wear will result between the head and the part on which it is mounted.

My present improvement contemplates the use of smooth faced friction blocks which will hold the brake head in any adjusted position, and consequently after the brakes are once applied and the head is adjusted, there is no return movement of the head to a position previously occupied, and consequently there is little or no wear between the head and the part of the beam on which it is mounted, because there is no movement between these parts.

Another feature of my invention is the utilization of a single spring whose expansive energies are exerted outwardly to move friction blocks, preferably in a radial direction, and transverse the axis of the beam.

In the drawings, 1 indicates the compression member and 2 the thrust block or part on which the brake head is mounted. This thrust block is provided with a threaded extension $2^a$, to which the tension rod is connected. I make no claim to this construction of beam as the same forms no part of this invetnion.

3 is the brake head whose socket is provided with oppositely disposed grooves $3^a$.

The thrust block is preferably provided with a non-circular opening $2^b$ extending transversely therethrough, in which opening are arranged two friction blocks 4, and an interposed coiled spring 5. The expansive energies of this coiled spring are exerted outwardly, so as to move the friction blocks in a direction transverse the axis of the beam and cause them to engage the inner face of the socket of the brake head and bind the same against movement. In placing the head in position, the blocks are pressed inwardly by some suitable instrument, and the head slipped in position. When the blocks register with the groove $3^a$, they move outwardly and thus lock the head against longitudinal displacement. The head can be rotatably adjusted on the beam and the friction of the outwardly pressed blocks will hold said head in such adjusted position. To further provide against the longitudinal movement of the head, a cotter pin, (not shown), may be arranged in the opening $2^c$, said cotter pin being long enough to have its ends extend in the path of movement of the head. To remove the head from the beam it is only necessary to give the head a quarter turn, when the inclined ends of the grooves $3^a$ will cause the friction blocks to move inwardly, and when said friction blocks engage with the reduced diameter of the socket, the head may be slipped from the beam.

It is obvious that the faces of the friction blocks 4 may be roughened or corrugated so as to increase their holding qualities, but in the preferred form of my invention, the faces are smooth, as shown. Where two friction blocks are employed with an interposed spring between them, the power of such single spring is equal to the power of two similar springs seated in pockets as has heretofore been the practice. The two outwardly pressed friction blocks with smooth faces and having a spring interposed between them will ordinarily be sufficient to hold the head in position on the beam against gravitation.

I claim:

1. The combination of a brake head, of a part on which the same is mounted, and expanding friction blocks carried by said part.

2. The combination of a brake head, a part on which the same is mounted, blocks carried by said part, and a spring interposed between said blocks for pressing them outwardly.

3. The combination of a brake head having a grooved socket, a part on which said brake head is mounted, and expanding blocks carried by said part and coöperating with the grooves in the socket of the brake head.

4. The combination of a brake head having a grooved socket, a part on which the same is mounted, friction blocks carried by said part, and a spring interposed between said blocks for forcing the same outwardly into coöperative relation with the grooved socket of the brake head.

5. The combination of a brake head, a part on which the same is mounted, said part being provided with a non-circular transversely disposed opening, blocks mounted in said opening and capable of outward movement, and means for moving said blocks outwardly.

6. The combination of a brake head, a part on which the same is mounted, expansible blocks carried by said part and means also carried by said part for moving said blocks outwardly to hold the head in rotatable adjusted positions.

7. The combination with a brake head, of a part on which said head is mounted and with respect to which said head is rotatably adjustable, a plurality of outwardly movable elements carried by said part, and means within the part for moving said elements outwardly to bind the head in adjustable positions.

In testimony whereof I hereunto affix my signature in the presence of two witnesses, this 8th day of January, 1910.

FREDERICK R. CORNWALL.

Witnesses:
M. P. SMITH,
L. CORRAO.